US008879544B1

(12) United States Patent
Rathnam et al.

(10) Patent No.: US 8,879,544 B1
(45) Date of Patent: Nov. 4, 2014

(54) OUTBOUND COMMUNICATION SESSION ESTABLISHMENT ON A TELECOMMUNICATIONS NETWORK

(71) Applicant: Bandwidth.com, Inc., Raleigh, NC (US)

(72) Inventors: Sai Rathnam, Raleigh, NC (US); Jared Kashimba, Micanopy, FL (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/320,784

(22) Filed: Jul. 1, 2014

Related U.S. Application Data

(63) Continuation-in-part of application No. 14/060,113, filed on Oct. 22, 2013.

(51) Int. Cl.
*H04L 12/66* (2006.01)
*H04W 92/02* (2009.01)
*H04M 7/00* (2006.01)
*H04L 29/06* (2006.01)

(52) U.S. Cl.
CPC .............. *H04W 92/02* (2013.01); *H04M 7/006* (2013.01); *H04L 65/1006* (2013.01)
USPC ........................................................ 370/352

(58) Field of Classification Search
CPC .............. H04L 29/1216; H04L 61/157; H04L 65/1069; H04M 2250/06; H04W 76/02
See application file for complete search history.

(56) References Cited

U.S. PATENT DOCUMENTS

| 2004/0266426 | A1* | 12/2004 | Marsh et al. | 455/426.2 |
| 2006/0286984 | A1* | 12/2006 | Bonner | 455/445 |
| 2007/0015535 | A1* | 1/2007 | LaBauve et al. | 455/552.1 |

* cited by examiner

*Primary Examiner* — Yong Zhou
(74) *Attorney, Agent, or Firm* — Gregory Stephens

(57) ABSTRACT

Disclosed are techniques for establishing a communication session in a call server between communication devices. A call server receives a communication session establishment message from a communication device that has an associated VoIP telephone number. The message is indicative of the communication device wanting to place a call to a target communication device that has an associated target telephone number. The communication session establishment message includes the VoIP telephone number, the target telephone number and a connection status indicator. The call server establishes a first communication link with the device based on the connection status indicator. The call server then establishes a second communication link with the target communication device. The call server may then join the first and second communication links to establish a communication session between the communication devices.

21 Claims, 6 Drawing Sheets

100

400

500

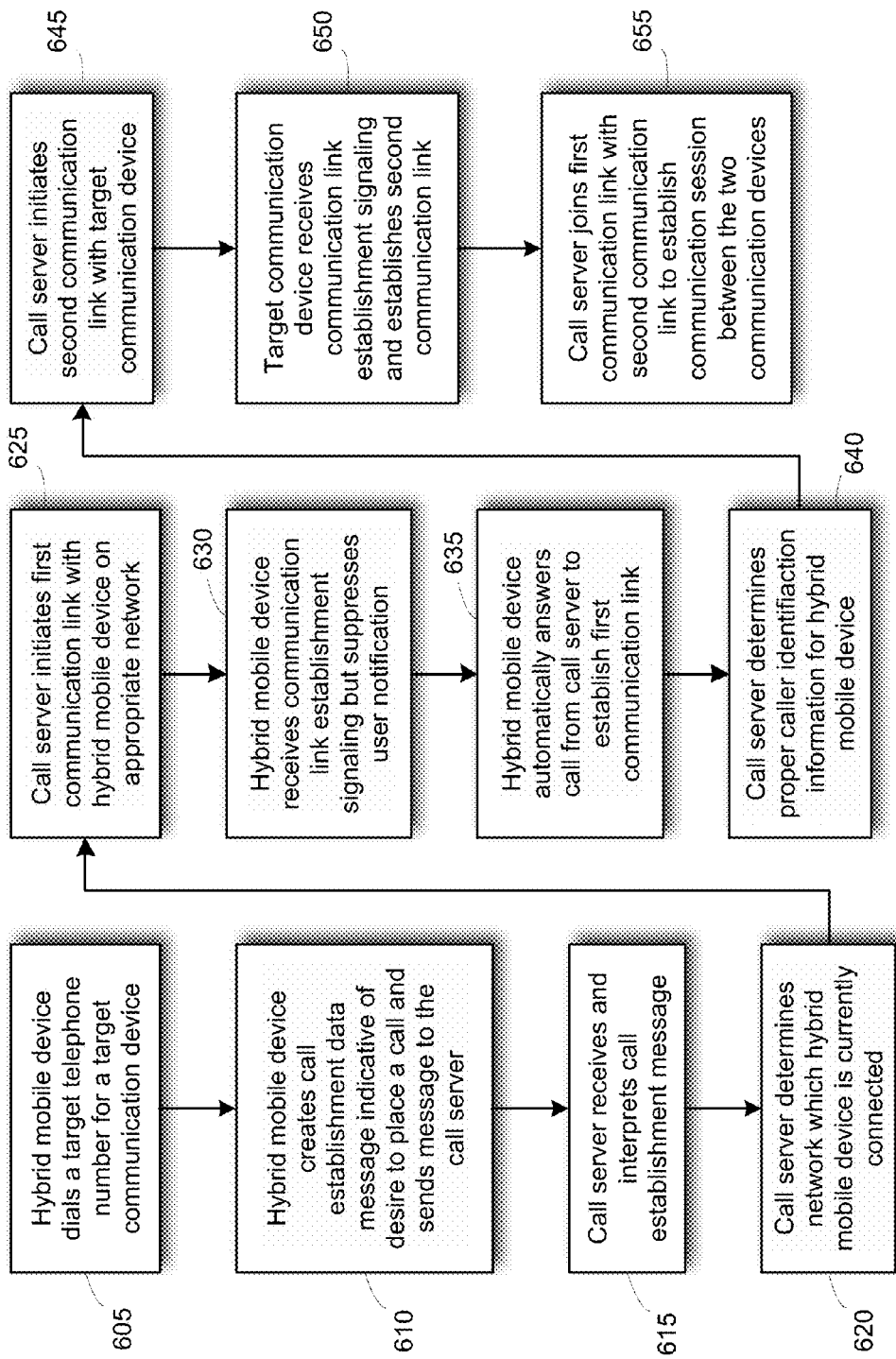

OUTBOUND COMMUNICATION SESSION ESTABLISHMENT ON A TELECOMMUNICATIONS NETWORK

CROSS-REFERENCE TO RELATED APPLICATIONS

The present application is a continuation-in-part to co-pending application Ser. No. 14/060,113 filed Oct. 22, 2013 entitled "Outbound Communication Session Establishment On A Telecommunications Network".

BACKGROUND

Mobile telephony devices utilizing wireless communication protocols are ubiquitous. Many of these devices utilize one of the competing cellular networks (e.g., GSM or CDMA) to place and receive telephone calls to other telephony endpoint devices. A telephony endpoint device may include another mobile telephony device on the same or another cellular network, a Voice-over-IP (VoIP) telephony device, and/or a plain old telephone service (POTS) telephony device. Each of these telephony endpoint devices may use a different access network but all are interfaced at some point to allow for communication among the different networks.

Recently, there has been introduced another type of mobile telephony device, one that is capable of utilizing multiple different networks depending on the current location or network conditions pertaining to the mobile telephony device. Such a mobile telephony device may be characterized as a hybrid mobile device due to its capability of making and receiving telephone calls on at least two distinct networks.

Described herein are methods, systems, and techniques for intelligently establishing calls on a telecommunications network.

BRIEF DESCRIPTION OF THE DRAWINGS

FIG. 6 illustrates an embodiment of a logic flow for establishing a communication session between two communication device endpoints in which the outbound calling communication device is a hybrid mobile device.

DETAILED DESCRIPTION

Figure 1:
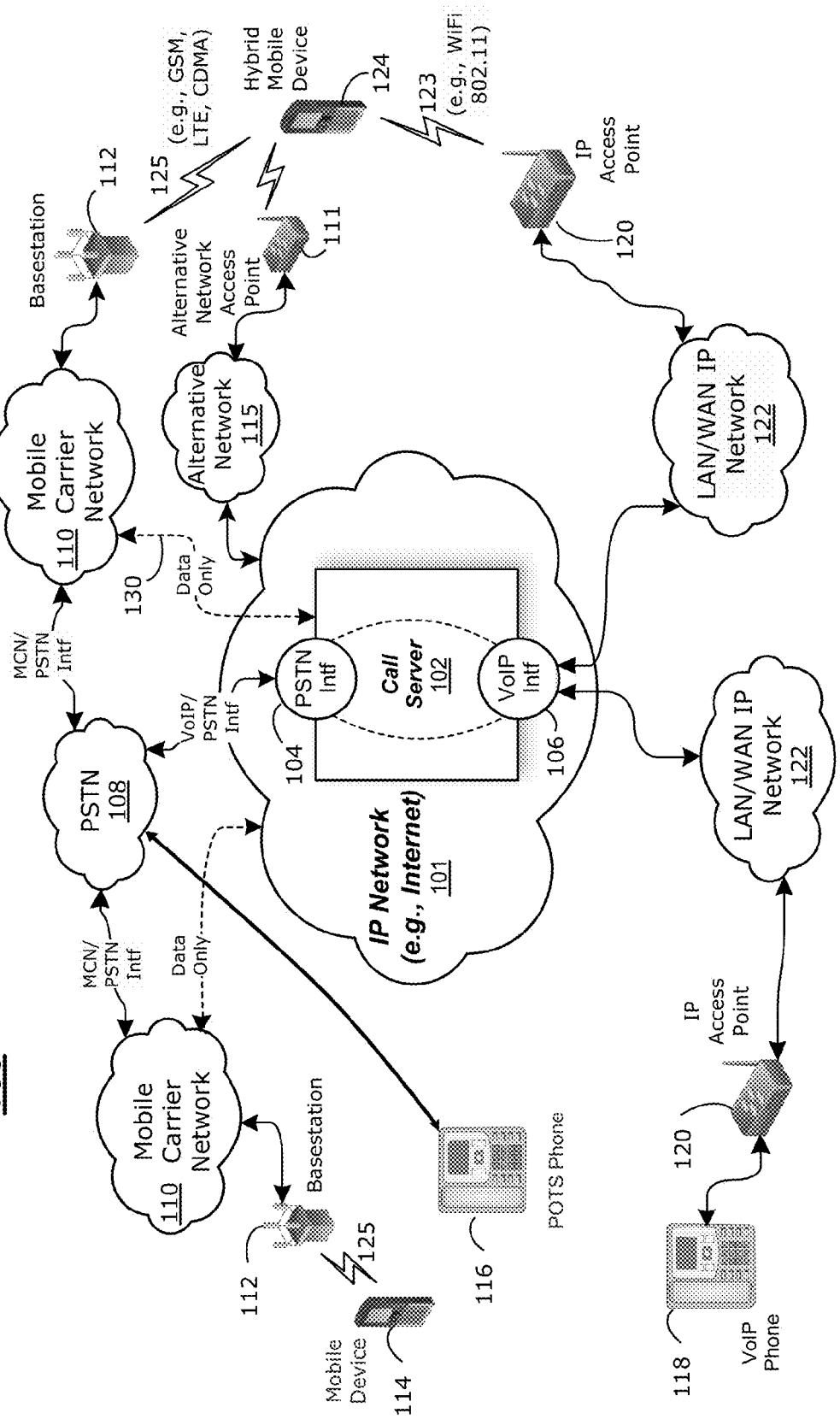
FIG. 1 illustrates an exemplary networked environment for implementing certain exemplary embodiments described herein.

The embodiments described herein disclose systems and methods for intelligently structuring, handling, and enhancing communication sessions between or among communication devices. The systems and methods of the invention may be embodied in and performed by communication devices, call servers and other devices, and software instructions executed by some or all of such devices, as will be explained in detail below. The different types of networks contemplated herein include, for example, cellular mobile networks, the public switched telephone network (PSTN), and data networks, such as the Internet or other IP-based networks, including wide area networks, local area networks, and combinations thereof.

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical or logical channel that connects two or more devices. A communication link may be a signaling link or a media link. In this context, a communication session may be established via one or more communication links. One or more media streams may be transmitted over a communication link. A call server may be situated between communication devices thereby making the call server an endpoint in a communication link. The call server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure discusses access networks that may be characterized as the portion of a communications network that connects subscriber communication devices to a service provider's core network. An access network may also be referred to as the interface between the communication device and the network. Another type of interface may be the interface between networks. That is, the interface necessary to facilitate seamless communications from one network to another.

Therefore, references herein to a communication device capable of connecting to or communicating via a mobile carrier network refer to a communication device equipped with a cellular transceiver for wireless communication with basestations and other mobile carrier network access points. Similarly, references herein to a communication device capable of connecting to or communicating via a data network refer to a communication device equipped with a transceiver or other network interface for wireless communication (e.g., 802.11) with a router or other data network access point. One particular communication device may be characterized herein as a wireless handset. A wireless handset may include multiple RF transceivers, one of which may be operable to connect to an access network for a mobile carrier network (e.g., cellular network) and another of which may be operable to connect to an access network for an IP data network (e.g., 802.11).

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 101, one or more IP based local area networks or wide area networks (LAN/WAN) 122, mobile carrier networks 110, and the PSTN 108. While these distinct networks utilize different protocols and signaling schemes, there are various interfaces that allow for the seamless transition of signaling, voice, and data (including text, audio, and video) such that various communication endpoints may communicate with one another over one or more of these inter-connected networks.

The PSTN 108 can be characterized as a circuit switched point-to-point communications network in which a physical connection between the endpoints is maintained for the duration of the connection. The PSTN 108 may also be referred to as the legacy telephone network as it is the backbone infrastructure for connecting endpoints comprised of Plain Old Telephone Service (POTS) phones 116.

Mobile carrier networks 110 (sometimes referred to as cellular networks) may come in different varieties based on the radio transmission scheme 125 between a communication device known as a wireless handset (e.g., mobile or cellular phone) 114 and the mobile carrier network basestation 112 that is in communication with the wireless handset 114. Two such radio transmission schemes are the Global System for Mobile Communications (GSM) and Code Division Multiple Access (CDMA). These radio transmission schemes are incompatible with one another necessitating an intervening interface to allow communication between endpoints on either network. In addition, each network may operate over specific frequency ranges. Often, there may even be an intervening network such as the PSTN 108 between two distinct mobile carrier networks 110. Each mobile carrier network 110 includes an interface to the PSTN 108 such that calls crossing that interface can be handled by the receiving network whether it is a mobile carrier network 110 or the PSTN 108.

Various mobile carrier network operators base their network on one of the radio transmission schemes 125 and provide service to wireless handsets 114 using that radio transmission scheme 125 over a defined frequency band. For example, a wireless handset 114 wirelessly communicates with a basestation 112 that serves as an access network to the mobile carrier network 110. The basestation 112 authenticates and authorizes the wireless handset 114 to the mobile carrier network 110 and, in conjunction with other equipment within the mobile carrier network 110, manages calls to and from the wireless handset 114. The mobile carrier network 110 provides connectivity for any wireless handsets 114 capable of cellular transmission that are physically located within range of the mobile carrier network 110. The range of a mobile carrier network 110 depends in part on an amplification, power, and/or energy associated with the antennas comprising cellular base station, wireless handsets 114 and the like. As the wireless handset 114 moves toward the outer range of the mobile carrier network 110, the strength of the cellular signals degrade.

Similarly, an IP based data network 122, 101 may provide wireless connectivity to wireless handsets 114 within range of an IP access point 120. For instance, an IP access point 120 may provide wireless connectivity using any of the 802.11 WiFi standards, WiMAX standards, and/or any other type of IP based connectivity standard. As will be appreciated by those of skill in the art, a wireless handset 114 may experience a stronger connection signal when located closer to an IP access point 120 than when located further away from the IP access point 120. Thus, the strength of the wireless data connection may fade as the wireless handset 114 moves away from an IP access point 120. Other factors in addition to signal strength may affect the sufficiency of an IP connection between a wireless handset 114 and an IP access point. Some of these factors include packet loss, jitter, latency, and link speed.

There may also be one or more alternative networks 115 that may provide access to the Internet 101 for a hybrid mobile device 124 or other wireless handset devices 114. One such alternative network 115 may be characterized as a WiMax network operable over the 802.16 wireless protocol standard. Another such alternative network 115 may be characterized as a whitespace network. A whitespace network may utilize RF spectrum that is shared with television broadcasters. The television broadcasters do not necessarily need to utilize all the spectrum allocated to them to broadcast their video signals. The unused spectrum may be tapped into to provide an alternative RF access point to an alternative network 115 that can interface with the Internet 101.

The collection of IP based data networks illustrated in FIG. 1 such as LAN/WANs 122, and the Internet 101 all run on a packet based data transfer protocol characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. VoIP communication devices 118 utilize an IP access point 120 to the larger IP network. The IP access point 120 may be wired, wireless (e.g., WiFi), or a combination wired/wireless access point such as those illustrated in FIG. 1. A VoIP communication device 118 may communicate with an IP access point 120 to gain access to the larger IP network 101 and other communication devices. The VoIP communication device 118 has been illustrated as a wireline type device but may just as easily be a wireless device communicable with the IP access point 120 over, for instance, one or more of the 802.11 protocols or other IP based data network protocols.

In certain embodiments, mobile carrier network(s) 110 include cellular networks or portions of cellular networks based on GSM, LTE, CDMA, and/or any other cellular network standards. IP based data networks 122, 101 include, for example, the Internet, one or more intranets, wide area networks (WANs), local area networks (LANs), and the like, portions or all of which may be wireless and/or wired. For instance, an IP based data network 122, 101 may be a wireless network or a portion of a wireless network implemented using an IEEE 802.11 standard, WiMAX, and/or any other wireless data communication standard. As is known in the art, the various networks 108 (PSTN), 110 (mobile carrier), 122, 101 (IP based) may interface with the call server 102 through gateway devices, routers and/or other appropriate devices (not shown). Similarly, the wireless handsets 114 may interface with the various networks 108 (PSTN), 110 (mobile carrier), 122, 101 (IP based) and alternative networks 115 through appropriate access points 111, 120 (some not shown).

As one may surmise, it is far less complicated when both communication devices in a communications system utilize the exact same network. For instance, POTS phone to POTS phone would communicate over the PSTN only while a GSM wireless handset to another GSM wireless handset of the same mobile service provider may be handled within the mobile carrier network. Lastly, a VoIP phone calling another VoIP phone would stay exclusively on a packet based series of networks like LAN/WANs, 122 and/or the Internet 101.

Things get more complicated when the communication devices are associated with different networks. For instance, a POTS phone placing a call to a wireless handset or a VoIP phone calling a POTS phone. In these scenarios, and others, there is an interface between the networks that serves to resolve any differences so that a communication session may be connected and maintained. As described above there may be an intervening network between two endpoint networks. For instance, each mobile carrier network 110 includes an interface to the PSTN 108 such that calls crossing that interface can be handled by the receiving network whether it is a mobile carrier network 110 or the PSTN 108. Similarly, each VoIP service provider on an IP packet based network 122, 101 includes an interface to the PSTN 108 such that calls crossing that interface can be handled by the receiving network whether it is an IP packet based network 122, 101 or the PSTN 108. Thus, the PSTN 108 serves as a common routing network for endpoint communication devices that are associated with other networks. It is possible to create a VoIP interface such that IP packet based networks 122, 101 can interface directly with mobile carrier networks 110.

There is one aspect that each network (e.g, PSTN 108, VoIP 101, 122 and mobile carrier 110) has in common that facilitates communication sessions among communication devices native to the various networks. The commonality is that each communication device has a unique telephone number (TN) as an identifier. The format of the telephone number is identical regardless of the network in use. In North America, for instance, the TN is a ten-digit number. Each communication device in North America is associated with a 10 digit telephone number that subscribers 'dial' to reach other subscribers no matter the network the other subscriber uses. Thus, users of communication devices need not worry about how to reach another user because all communication devices key off an associated telephone number. From the user's perspective, it is up to the networks to resolve any connection issues and allow calls to be connected so that a communication session may occur. For the most part, these network differences have been resolved on an industry wide scale and it is relatively routine to place and connect calls between endpoints regardless of their native networks.

Each network service provider may provide equipment (communication devices) and service plans to its subscribers. These service plans can vary greatly in cost depending on the expected use of network resources. In addition, some service plans may bundle data and voice services in the cost of the service plan. This is often the case for mobile carrier network 110 subscribers since the ability to access data networks such as the Internet on a mobile device is a desired service. This is especially the case when an IP based data network connection is out of range. As a result, bundled voice and data services can place a significant burden on the mobile carrier network resources that can lead to use restrictions for bundled voice/data plans.

One approach that addresses the mobile network congestion problem is a communication device that may be characterized as a hybrid mobile device 124. The hybrid mobile device 124 may be associated with network infrastructure that defaults telephony services to an IP based data network connection 123 using, for instance, VoIP over an 802.11 protocol via an IP access point 120. The hybrid mobile device 124 may default to IP based data network mode when available and sufficient to support VoIP calling and may only switch to a mobile carrier network 110 connection via a radio transmission scheme 125 to a basestation 112 (cellular mode) when the IP based data network connection 123 is lost, insufficient for VoIP purposes, or otherwise unavailable. As it pertains to data, this heterogeneous network switching may be referred to as WiFi offloading. For telephony services, however, such a soft handover between heterogeneous networks is a more daunting and complex process.

One implementation of network switching of a voice call between heterogeneous networks involves associating two telephone numbers to a hybrid mobile device 124. A first telephone number may be characterized as a 'data' telephone number that is based on a VoIP telephony scheme. The second number may be characterized as a 'mobile' telephone number that is used in conjunction with a radio transmission scheme 125 associated with a mobile carrier network 110. The subscriber may only be aware of the data number and not have actual knowledge of the mobile number. For all intents and purposes, the subscriber places and receives calls using the data telephone number. To reach the subscriber, a second communication device would dial the subscriber's data telephone number.

When the hybrid mobile device 124 is sufficiently connected with an IP access point 120, telephony services and functions are handled using VoIP. To dial out, the subscriber dials the telephone number of the intended recipient's communication device. The intelligence within the hybrid mobile device 124 recognizes that the subscriber is attempting to place a call and creates a outbound communication session establishment data message to be sent to a call server based 102 in an IP network 101. The communication session establishment message notes the target telephone number, the source telephone number and a WiFi connection status indicator. In the case of a hybrid mobile device 124, there may be two telephone numbers associated with the hybrid mobile device 124. A first telephone number may be characterized as the public number and may be associated with the VoIP (e.g., WiFi or other IP based data network) calling capabilities of the hybrid mobile device 124 while a second telephone number may be associated with a mobile carrier network so as to permit cellular telephony. The cellular telephone number may be hidden or masked from the user. Thus, for a hybrid mobile device 124, the communication session establishment message created upon the user dialing a target number may include both the VoIP telephone number and cellular telephone number as the source telephone number. The VoIP telephone number may be used by the call server 102 for caller identification services as will be described later.

Other data in the communication session establishment may include, for instance, a connection status indicator. The WiFi connection status indicator may be a binary type flag that indicates whether the hybrid mobile device 124 currently has a WiFi connection with an IP access point 120 that is sufficient to support VoIP calling at a particular quality level. Not all IP connections may be deemed sufficient to support VoIP calling. For example, a combination of network status parameters including, signal strength, link speed, jitter, packet loss, and latency may be monitored to ensure the IP connection will provide satisfactory call quality using VoIP over WiFi. Thus, it is not enough to simply have a WiFi connection with an IP access point 120, the connection must be sufficient from a quality standpoint for it to be used to establish a call.

A utility or application executing on the hybrid mobile device 124 may continuously monitor and compare the aforementioned network status parameters against one or more profiles of network status parameters deemed sufficient for VoIP call quality. So long as the current network status parameter profile falls within the range of at least one satisfactory network status parameter profile, the connection status indicator may be set to good. If the current network status parameter profile falls outside the range of the satisfactory network status parameter profiles, the connection status indicator may be set to bad.

In another embodiment, the individual network status parameters may be sent to the call server 102 so that the call server 102 may also determine the quality of the IP connection for the hybrid mobile device 124 on its own.

In operation, the hybrid mobile device 124 does not actually attempt to dial the target number. Rather, the communication session establishment message containing the information needed to establish the desired call is sent to the call server 102 over an IP based data channel. The IP based data channel may accommodate MQTT messages over a WiFi connection with an IP access point 120 or over a cellular IP data connection over a mobile carrier network 110.

The call server 102 interprets the communication session establishment message to determine that the hybrid mobile device 124 wishes to establish a telephone call with the target telephone number. The call server 102 may then silently ring back the hybrid mobile device 124 to establish a first communication link. The call server 102 may silently ring back on the network to which the hybrid mobile device 124 is connected using the telephone number associated with that network. Silent ring-back refers to placing a call from the call server 102 to the hybrid mobile device 124 that suppresses any user notification (e.g., ringing or vibrating) and is automatically answered. For instance, the VoIP telephone number may be used when the hybrid mobile device 124 has an established IP based data network connection of sufficient quality. In cases when the hybrid mobile device 124 does not have an established IP based data network connection of sufficient quality, the cellular telephone number may be used via a cellular connection involving the mobile carrier network 110.

The call server 102 will also signal (e.g. ring) the communication device associated with the target telephone number and establish a second communication link upon a user answering. In signaling the communication device associated with the target telephone number, the call server 102 may insert the telephone number of the hybrid mobile device 124 in the caller identification field. In the case of a hybrid mobile device 124 having two telephone numbers associated therewith, the call server may insert the "public" or VoIP telephone number of the hybrid mobile device 124 and mask the other (e.g., cellular) telephone number even if the masked telephone number is actually being used to establish a communication link between the call server 102 and the hybrid mobile device 124. Upon connecting the second communication link between the call server 102 and the communication device associated with the target telephone number, the call server 102 joins the first communication link with the second communication link to create a full-duplex communication session between the hybrid mobile device 124 and the communication device associated with the target telephone number.

In another embodiment, the initial communication session establishment message may be sent from the outbound calling device to the call server 102 via SMS text message. The SMS text message may be automatically created by the hybrid mobile device 124 and populated with the relevant data in an expected format such that the call server 102 may extract the source and target telephone numbers and the WiFi connection status indicator. The communication session establishment message may be sent over a WiFi connection with an IP access point 120 or over a cellular IP data connection over a mobile carrier network 110.

Figure 2:
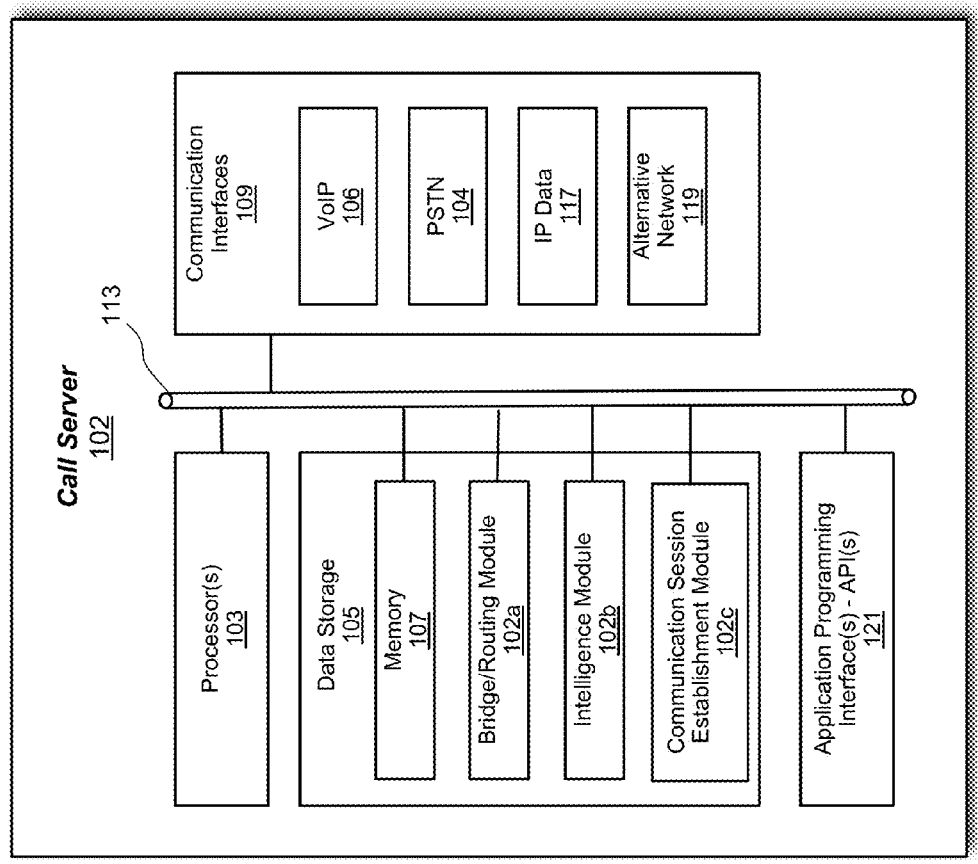
FIG. 2 is a block diagram illustrating some of the functions of the call server according to one or more embodiments described herein.

FIG. 2 is a block diagram illustrating some of the functions of the call server according to one or more embodiments described herein. The call server 102 may comprise, for example, a server computer or any other system having computing capability. The schematic block diagram shows that the call server 102 may include at least one processor 103, at least one communication interface 109 (e.g., a network interface card or the like), and a data storage component 105, each of which is coupled to a local interface 113. The local interface 113 may comprise, for example, a data bus with an accompanying address/control bus or other bus structure as can be appreciated. Stored in the data storage component 105 are a memory 107 and multiple components 102a-102c (e.g., software applications) that are executable by the processor 103 and that provide at least some of the functionality of the call server 102.

Alternatively, a plurality of call servers 102 may be employed and may be arranged, for example, in one or more server banks or computer banks or other arrangements. For example, a plurality of call servers 102 together may comprise a cloud computing resource, a grid computing resource, and/or any other aggregated or distributed computing arrangement. Such call servers 102 may be located in a single installation or may be distributed among different geographical locations. For purposes of convenience, the call server 102 is illustrated in FIGS. 1 and 2 and referred to herein in the singular. Even though the call server 102 is referred to in the singular, it is understood that a plurality of call servers 102 may be employed in various arrangements as described above.

The communication interface(s) 109 may include a voice-over-IP (VoIP) interface 106 adapted to exchange IP based audio data with other IP network devices using a VoIP protocol. Another communication interface 109 may be a PSTN interface 104 adapted to convert incoming PSTN audio data to VoIP audio data and convert outgoing VoIP audio data to PSTN audio data. Still another communication interface 109 may be an IP data interface 117 adapted to exchange IP data with other IP network devices. This may include IP data exchanged with a mobile wireless handset 114, 124 over an intermediate mobile carrier network 110. Yet another communication network interface 109 may be directed toward an alternative network 115 adapted to exchange data with a wireless handset 114 or a hybrid mobile device 124. Examples of alternative network(s) 115 may include, but are not limited to, WiMax and whitespace. A whitespace network may be characterized as one that utilizes frequency spectrum that is overlapping with that of broadcast television frequency spectrum.

The call server 102 may further include several inter-operable software modules operable with application programming interfaces (APIs) 121 and communication interfaces 109 and configured to intelligently manage the communication session. These software modules may include a bridge/routing module 102a, an intelligence module 102b, and a communication session establishment module 102c. The aforementioned software modules have functional names for convenience and ease of reference. These functional names should not be construed as limiting to the various software modules individually or the call server 102 as a whole. There may be functions performed by one or more of the software modules in conjunction with the APIs 121 and network communication interfaces 109 that achieve a stated purpose or goal.

The bridge/routing module 102a may be configured to physically or logically connect communication links. The intelligence module 102b may be configured to monitor network conditions and receive communication session data from the hybrid mobile device 124 regarding its connection with the IP access point 120. Communication session data may refer to any data relating to a communication session or its constituent communication link(s), such as, but not limited to, detected signal strengths, available networks, protocol and buffer statistics and analysis, environmental and/or geographical factors, the performance of access points and other network components, past interactions between or among communication devices, access points and other network components, context of conversations during voice calls, and other data points described herein. The communication session establishment module 102c may be configured to initiate an outbound call from one communication device to another communication device with the assistance of the bridge/routing module 102*a* and the intelligence module 102*b*.

More specifically, the bridge/routing module 102*a* may cooperate with the APIs and network interfaces to physically or logically connect communication links to initially establish a communication session between communication devices. A communication session may be, for instance, between a hybrid mobile device 124 and a second telephony endpoint (e.g., 114, 116, 118). The bridge/routing module 102*a* may be configured to physically or logically establish communication links, join communication links, and sever communication links to a common or shared communication session based on commands or instructions received from the call server 102.

The intelligence module 102*b* may cooperate with the APIs 121 and communication interfaces 109 to monitor and gather (receive) data pertaining to network conditions and communication device connections with various networks. The data may then be intelligently processed to determine the communication links with which to establish a communication session (e.g., telephone call). The data received by the intelligence module 102*b* may include out of band and/or out of network signaling from a communication device to indicate that a call is to be established. In such a case, the intelligence module 102*b* may instruct the call server 102 to establish a new communication link via the bridge/routing module 102*a* with each communication device and then bridge them together to establish the call.

The communication session establishment module 102*c* may cooperate with the APIs 121 and communication interfaces to establish a first communication link between the call server 102 and the outbound calling communication device and a second communication link between the call server 102 and a communication device associated with the target telephone number. The communication session establishment module 102*c* may receive data and instructions from the intelligence module 102*b* that indicates a communication device desires to make an outbound call to a target communication device. The communication session establishment module 102*c* may then execute certain instructions to initiate a first communication link between the call server 102 and the outbound calling communication device and also initiate a second communication link between the call server 102 and the target communication device. Once the second communication link has been established, the communication session establishment module 102*c* may instruct the bridge/routing module 102*a* to join the second communication link to the communication session with the first communication link between the call server 102 and the outbound calling communication device to establish the call. Thus, the call server 102 is responsible for initiating, establishing, and joining separate communication links with both the outbound calling communication device and the target communication device based on signaling initiated by the outbound calling communication device.

The call server 102 may execute various applications and/or other functionality for, among other things, setting-up, managing and tearing-down communication sessions between communication devices 124 and 114, 116, 118. Also, various data may be stored in a data storage 105 via memory 107 of the call server 102. Data storage 105 illustrated in FIG. 2 may be representative of a plurality of data stores, as can be appreciated. The data stored in the data storage 105, for example, may be associated with the operation of the various applications and/or functional entities of the call server 102.

Figure 3:
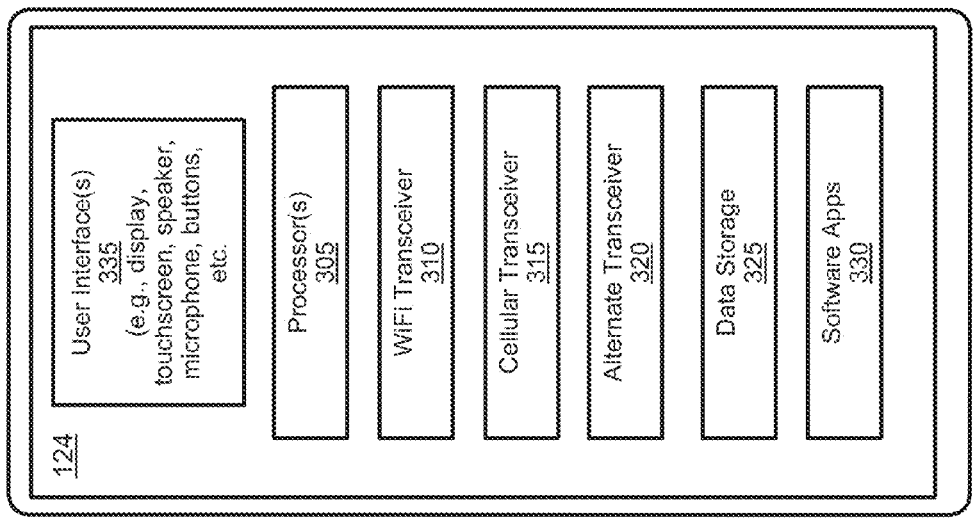
FIG. 3 is a block diagram illustrating a hybrid mobile device according to one or more embodiments described herein.

FIG. 3 is a block diagram illustrating a hybrid mobile device 124 according to one or more embodiments described herein. The hybrid mobile device 124 may include a processor or processors 305 for controlling the various components and functions of the hybrid mobile device 124. The hybrid mobile device 124 may also include multiple RF transceivers such as, for instance, a WiFi transceiver 310, a cellular transceiver 315, and an alternate transceiver 320. The alternate transceiver may be communicable with a non 802.11 IP based data network.

The WiFi transceiver 310 may be operable to communicate with an IP network access point 120 using one or more of the 802.11 wireless transmission protocols. Upon connection with an IP network access point 120, the hybrid mobile device 124 may exchange IP data with servers or other computers that are connected with or communicable with the Internet 101 via LAN/WAN 122. This may include the call server 102 shown in FIG. 1.

The cellular transceiver 315 may be operable to communicate with a mobile carrier network 110 for both voice and IP data communications. On the voice side, the mobile carrier network 110 may be based on GSM, CDMA, or other communications protocols while on the IP data side, the mobile carrier network 110 may be based on, for example, GPRS, EDGE, EV-DO, HSPA-D, HSPA-U, LTE, UMTS-WCDMA, UMTS-TDD, etc.

In one embodiment, the alternate transceiver 320 may be a WiMax transceiver that is operable to communicate with an IP network access point using one or more of the 802.16 wireless transmission protocols. Upon connection with a WiMax network access point, the hybrid mobile device 124 may exchange IP data with servers or other computers that are connected with or communicable with the Internet 101 via WiMax network 115. This may include call server 102 shown in FIG. 1. In another embodiment, the alternate transceiver 320 may be a whitespace transceiver that is operable to communicate with a whitespace network access point. The whitespace network, in turn, may be communicable with the Internet 101 to allow IP data communications between the hybrid mobile device 124 and servers or other computers that are connected with or communicable with the Internet 115. This may include call server 102 shown in FIG. 1.

The hybrid mobile device 124 may further include data storage 325, software applications 330, and various user interface(s) 335. The data storage 325 may include, for example, one or more types of memory devices including, but not limited to, flash memory usable for ROM, RAM, PROM, EEPROM, and cache. The software applications 330 may include, for example, one or more software applications executable on or by the processor(s) 305 including, but not limited to, web browsers, email applications, application specific data and/or audio/video applications, call handoff applications, etc. The user interface(s) 335 may include, for example, a display, a touchscreen for soft-key input, speaker(s), microphone(s), a keyboard for hard-key input, and one or more buttons.

Figure 4:
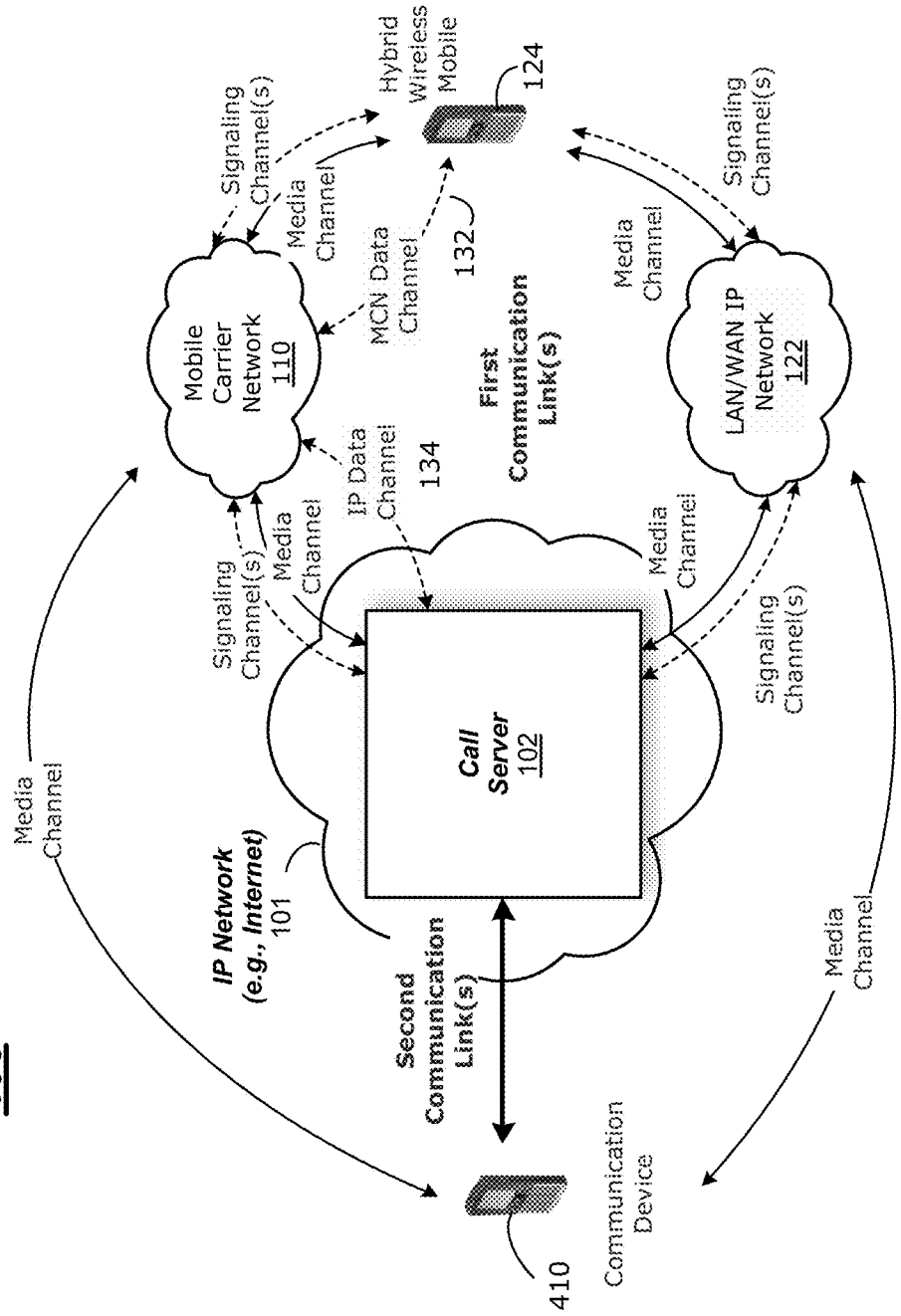
FIG. 4 is a block diagram illustrating establishing a communication session between communication devices according to one or more embodiments described herein.

FIG. 4 is a block diagram illustrating establishing a communication session between communication devices 124, 410 according to one or more embodiments described herein. In this implementation, the hybrid mobile device 124 may have two telephone numbers associated therewith. A first telephone number may be characterized as a 'data' telephone number that is based on a VoIP telephony scheme implemented on an IP network such as, for instance, LAN/WAN IP network 122 communicable with Internet 101. The second number may be characterized as a 'mobile' telephone number that is used in conjunction with a radio transmission scheme 125 associated with a mobile carrier network 110. The user may only be aware of the data number and not have actual knowledge of the mobile number. For all intents and purposes, the user places and receives calls using the data telephone number. To reach the user, a second communication device 410 would dial the user's hybrid mobile device 124 data telephone number.

When the hybrid mobile device 124 has established a VoIP sufficient connection with an IP access point 120 to IP network 122, telephony services and functions are handled using VoIP. To place a call, the user dials the telephone number of the intended recipient's communication device 410 using a dialer application that may be one of the software applications 330. The intelligence within the hybrid mobile device 124 recognizes that the user is attempting to place a call and notes the telephone number entered. In actuality, the hybrid mobile device 124 does not actually attempt to dial the target number. Rather, a communication session establishment message containing the information needed to establish the desired call is sent to the call server 102 over an IP based data channel. The IP based data channel may be a mobile carrier network (MCN) data channel 132 adapted to allow the hybrid mobile device 124 to communicate over the Internet 101 via the mobile carrier network 110. The IP based data channel may also be a signaling channel adapted to allow the hybrid mobile device 124 to communicate over the Internet 101 via an 802.11 WiFi access point 120 or other IP based data network access point to a LAN/WAN IP network 122. In another embodiment, the communication session establishment message containing the information needed to establish the desired call is sent to the call server 102 as an SMS text message.

The call server 102 receives and interprets the communication session establishment message to determine that the source telephone number wishes to establish a telephone call with the target telephone number. The call server 102 may then silently ring back the outbound calling communication device (e.g., hybrid mobile device 124) to establish a first communication link. In the case when the outbound communication device is a hybrid mobile device 124, the call server 102 may silently ring back on the network to which the hybrid mobile device is connected using the telephone number associated with that network. For instance, the VoIP telephone number may be used when the hybrid mobile device 124 has an established IP based data network connection and the cellular telephone number may be used when the hybrid mobile device 124 can only be reached via a cellular connection.

The call server 102 will also signal the communication device associated with the target telephone number and establish a second communication link. In signaling the communication device 410 associated with the target telephone number, the call server 102 may insert the source telephone number in the caller identification field. In the case of a hybrid mobile device 124 having two telephone numbers associated therewith, the call server may insert the "data" telephone number of the hybrid mobile device 124 and mask the mobile telephone number even if the mobile telephone number is actually being used to establish a communication link between the call server 102 and the hybrid mobile device 124. Upon connecting the second communication link between the call server 102 and the communication device 410 associated with the target telephone number, the call server 102 joins the first communication link with the second communication link to create a full-duplex communication session between the hybrid mobile device 124 and the communication device 410 associated with the target telephone number.

In all of the aforementioned communication session establishment scenarios, the called communication device 410 may be a mobile device 114, a POTS phone 116, or a VoIP phone 118. The communication link between the call server 102 and the called communication device 410 may be routed over the appropriate network depending on the type of communication device 410.

A call between the hybrid mobile device 124 and a called communication device 410 mediated by call server 102 may be established using the session initiation protocol (SIP). In SIP, IP addresses and ports are exchanged and an audio (and/or video) codec is negotiated for the exchange of media. Audio (and/or video) from both ends flows using Real-time Transport Protocol (RTP) and the selected codec(s). The hybrid mobile device 124 may also maintain an open data channel with the call server 102 using, for example, a protocol called Message Queue Telemetry Transport (MQTT). MQTT is an open message protocol for machine-to-machine communications that enables the transfer of telemetry-style data in the form of messages from pervasive devices, along high latency or constrained networks, to a server or small message broker. Pervasive devices may range from, for example, sensors and actuators, to mobile phones, embedded systems on vehicles, or laptops and full-scale computers.

The communication session establishment message may be sent from the communication device to the server using this MQTT data channel. As long as the communication device has some sort of network (e.g., IP or mobile carrier) connection, the MQTT channel is available. The MQTT channel is not in the path of the exchange of media between the hybrid mobile device 124 and the call server 102. Additionally or alternatively, the communication session establishment message may use, for example, a text message, or non 802.11 IP network access such as white space, or LTE.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
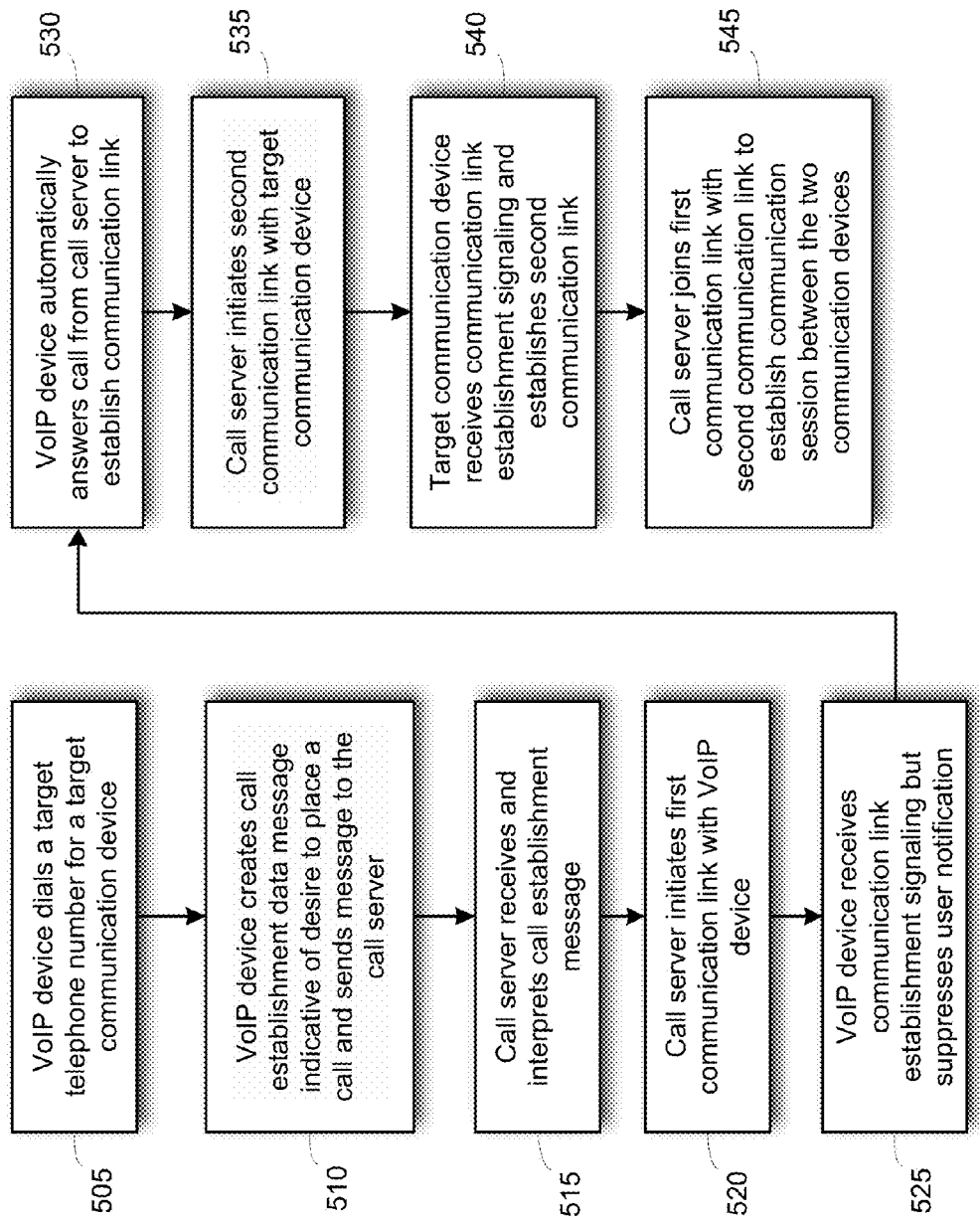
FIG. 5 illustrates an embodiment of a logic flow for establishing a communication session between two communication device endpoints.

FIG. 5 illustrates one embodiment of a logic flow 500 for establishing a communication session between two communication device endpoints. The logic flow 500 may be representative of some or all of the operations executed by one or more embodiments described herein. In this embodiment, steps are disclosed that allow a VoIP device to signal a call server 102 that the VoIP device would like to place a call to another communication device.

In the illustrated embodiment shown in FIG. 5, the logic flow 500 may dial a target telephone number for a target communication device at block 505. For example, a user of the VoIP device enters the digits of a target telephone number via a keypad or other user interface (e.g., selecting a contact from a contacts list) associated with the VoIP device. Rather than actually dialing the number, the VoIP device creates a communication session establishment data message indicative of the user's desire to place a call and sends the communication session establishment data message to the call server 102 at block 510. For example, a process in the VoIP device receives information pertaining to the target telephone number and creates the communication session establishment data message that includes both the target telephone number and the source telephone number (e.g., the telephone number of the VoIP device). The communication session establishment data message may then be sent to the call server 102 over an open data channel. The open data channel may be an IP compatible MQTT data channel communicable over an 802.11 WiFi access point or other IP based data network access point to connect to the Internet.

The logic flow 500 may receive and interpret the communication session establishment data message in the server at block 515. For example, the call server 102 can unpack the communication session establishment data message to retrieve the source and target telephone numbers. The call server 102 may then initiate call signaling via the source number back to the VoIP device at block 520. For example, the call server may send a SIP invite to the VoIP telephone number received in the communication session establishment message. The VoIP device may receive the call signaling SIP invite and respond with a SIP 200 signal followed by a SIP acknowledgement from the call server 102 thereby establishing a first communication link. The VoIP device may receive and respond to the call signaling from the call server 102 but suppress any kind of call notification at block 525. Call notification suppression may be performed because the user thinks she is making an outbound call and could become confused if she does not know an inbound call is being used for outbound purposes. Thus, the VoIP device may automatically answer the call signaling received from the call server 102 and establish a first communication link at block 530.

Upon establishing the first communication link, the call server 102 may then initiate and send call signaling to the target communication device at block 535. For example, the call server 102 may send a SIP invite to the target telephone number received in the communication session establishment message. The target communication device may receive the call signaling SIP invite and respond with a SIP 200 signal followed by a SIP acknowledgement from the call server 102 thereby establishing a second communication link at block 540. The second communication link is between the call server 102 and the target communication device. There may be one or more intermediate telephone networks (e.g., PSTN, cellular) between the call server 102 and the target communication device depending on what type of network with which the target telephone number is associated.

The call server may now join the second communication link to the first communication link between the call server and the VoIP device (calling device) thereby establishing a communication session between the VoIP device and the target communication device at block 545. The call server 102 may remain in the call path and mediate the call.

It should be noted that the above process may also be applied to a conference call scenario in which more than two parties are involved. The communication session establishment message, for example, may include multiple target numbers. The call server 102 may initiate and establish communication links with each one and bridge each new communication link to those that already exist to establish a conference call.

FIG. 6 illustrates an embodiment of a logic flow for establishing a communication session between two communication device endpoints in which the outbound calling communication device is a hybrid mobile device. In this embodiment, steps are disclosed that allow a hybrid mobile device to signal a call server 102 that the hybrid mobile device would like to place a call to another communication device.

In the illustrated embodiment shown in FIG. 6, the logic flow 600 may dial a target telephone number for a target communication device at block 505. For example, a user of the hybrid mobile device 124 like that described in FIG. 3 enters the digits of a target telephone number via a keypad or other user interface (e.g., selecting a contact from a contacts list) associated with the hybrid mobile device. Rather than actually dialing the number, the hybrid mobile device 124 creates a communication session establishment data message indicative of the user's desire to place a call and sends the communication session establishment data message to the call server 102 at block 610. For example, a process in the hybrid mobile device 124 receives information pertaining to the target telephone number and creates the communication session establishment data message that includes both the target telephone number and the source telephone numbers. In addition, the same (or another) process monitors the network status parameters (e.g., signal strength, link speed, jitter, packet loss, and latency) and determines the setting for the connection status indicator.

The hybrid mobile device 124 may have two telephone numbers—one for VoIP communications and one for cellular communications. Both source numbers are sent so that the call server 102 can determine which one to use for communication session establishment based on a determination of which type of network (WiFi or cellular) the hybrid mobile device 124 is currently able to support based on the connection status indicator. The communication session establishment data message may then be sent to the call server 102 over an open data channel. The open data channel may be an IP compatible MQTT data channel communicable over an 802.11 WiFi access point or other IP based data network access point to connect to the Internet. Alternatively, the IP compatible MQTT data channel may traverse a cellular connection between the hybrid mobile device and an access point (e.g., basestation) of a mobile carrier network before being forwarded to the call server in the IP network. The hybrid device may use whichever open data channel is currently available to communicate with the call server 102.

The logic flow 600 may receive and interpret the communication session establishment data message in the server at block 615. For example, the call server 102 can unpack the communication session establishment data message to retrieve the source and target telephone numbers as well as the connection status indicator. The call server 102 may then determine presence (where to send the call) based on the current network contact(s) of the hybrid mobile device 124 and the connection status indicator. This information could have been previously established at the call server 102 via provisioning and/or registration(s) on a network. This presence information may also be augmented or included in the communication session establishment message.

The call server 102 may then initiate communication session establishment via the network contact(s) with which the hybrid mobile device 124 currently has presence at block 625. For example, the call server 102 may send a SIP invite to the registered SIP contact associated with the hybrid mobile device 124 in the communication session establishment message if the connection status indicator indicates a VoIP sufficient WiFi IP connection for the hybrid mobile device 124. The hybrid mobile device 124 may receive the call signaling SIP invite and respond with a SIP 200 signal followed by a SIP acknowledgement from the call server 102 thereby establishing a first communication link. If the connection status indicator indicates an insufficient WiFi IP connection, the invite may need to be converted to non-SIP signaling and traverse a mobile carrier network 110 to reach the hybrid mobile device 124. The hybrid mobile device 124 may receive the call signaling from the call server 102 but suppress any kind of call notification at block 630. Call notification suppression may be performed because the user thinks she is making an outbound call and could become confused if she does not know an inbound call is being used for outbound purposes. Thus, the hybrid mobile device may automatically answer the call signaling received from the call server 102 and establish a first communication link at block 635.

Upon establishing the first communication link, the call server 102 may then determine the proper caller identification information at block 640 and initiate establishment of the second communication link to the target communication device at block 645. For example, the call server 102 may send a SIP invite to the target telephone number received in the communication session establishment message using the VoIP number of the hybrid mobile device. The VoIP number of the hybrid mobile device 124 may be used for caller identification purposes because it is the only telephone number known to the caller. The target communication device may receive the call signaling SIP invite and respond with a SIP 200 signal followed by a SIP acknowledgement from the call server 102 thereby establishing a second communication link. If the target communication device is not a VoIP device, there may be one or more intermediate telephone networks (e.g., PSTN, cellular) between the call server 102 and the target communication device requiring signaling conversion depending on what type of network with which the target telephone number is associated.

The call server 102 may now join the second communication link to the first communication link between the call server and the hybrid mobile device (calling device) thereby establishing a communication session between the hybrid mobile device and the target communication device at block 655. The call server 102 may remain in the call path and mediate the call.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the flowcharts of FIGS. 5-6 each show a specific order of execution, it is understood that the order of execution may differ from that which is depicted. Also, steps shown in succession in the flowcharts may be executed concurrently or with partial concurrence. Further, in some embodiments, one or more of the steps shown in the flowcharts may be skipped or omitted. In addition, any number of counters, state variables, warning semaphores, or messages might be added to the logical flows described herein, for purposes of enhanced utility, accounting, performance measurement, or providing troubleshooting aids, etc. It is understood that all such variations are within the scope of the present disclosure.

Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

A memory is defined herein as including both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may comprise additional systems designed to coordinate this communication, including, for example, performing load balancing. A processor may be of electrical or of some other available construction.

Although the bridge/routing module 102a, intelligence module 102b, and communication session establishment module 102c and other various systems and components described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic, functionality or application described herein, including the bridge/routing module 102a, intelligence module 102b, and communication session establishment module 102c, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method of establishing a call between a hybrid mobile device and a target communication device mediated by an IP network based call server, the method comprising:
   in the call server:
      receiving a communication session establishment message from the hybrid mobile device, the hybrid mobile device having an associated VoIP telephone number and an associated cellular telephone number, the message indicative of the hybrid mobile device wanting to place a call to the target communication device, the target communication device having an associated target telephone number, the communication session establishment message including information pertaining to the VoIP telephone number, the cellular telephone number, the target telephone number, and a connection status indicator, the connection status indicator indicative of whether the hybrid mobile device has an IP connection with an IP access point sufficient to support VoIP telephony;
      determining whether the hybrid mobile device is currently connected to an IP network access point;
      establishing a first communication link between the call server and the hybrid mobile device using the VoIP telephone number over a packet data network when the connection status indicator for the hybrid mobile device is sufficient;
      establishing a first communication link between the call server and the hybrid mobile device using the cellular telephone number over a cellular network when the connection status indicator for the hybrid mobile device is insufficient;
      establishing a second communication link between the call server and the target communication device using the target telephone number; and
      joining the first and second communication links to establish a communication session between the hybrid mobile device and the target communication device.

2. The method of claim 1, further comprising:
   inserting the VoIP telephone number of the hybrid mobile device in a caller ID field when establishing a second communication link between the call server and the target communication device.

3. The method of claim 1, wherein the communication session establishment message is comprised of a Message Queue Telemetry Transport (MQTT) message delivered over an IP network.

4. The method of claim 1, wherein the communication session establishment message is comprised of a Message Queue Telemetry Transport (MQTT) message delivered, in part, over an IP channel of a cellular network.

5. The method of claim 1, wherein the communication session establishment message is received as an SMS text message delivered over an IP network.

6. The method of claim 1, wherein the communication session establishment message is received as an SMS text message delivered, in part, over a cellular network.

7. The method of claim 1, wherein establishing the first communication link comprises:
   sending a Session Initiation Protocol (SIP) invite to the hybrid mobile device, wherein the SIP invite is sent over (i) one or more IP networks using the VoIP telephone number of the hybrid mobile device when the connection status indicator for the hybrid mobile device is sufficient, or (ii) one or more IP networks and at least a portion of a mobile carrier network using the cellular telephone number of the hybrid mobile device when the connection status indicator for the hybrid mobile device is sufficient;
   receiving a SIP 200; and
   sending a SIP acknowledgement.

8. A call server operable in an Internet Protocol (IP) based packet data network, the call server comprising:
   a processor operable to execute one or more software modules, the software modules including instructions that when executed:
      receive a communication session establishment message from the hybrid mobile device, the hybrid mobile device having an associated VoIP telephone number and an associated cellular telephone number, the message indicative of the hybrid mobile device wanting to place a call to the target communication device, the target communication device having an associated target telephone number, the communication session establishment message including information pertaining to the VoIP telephone number, the cellular telephone number, the target telephone number, and a connection status indicator, the connection status indicator indicative of whether the hybrid mobile device has an IP connection with an IP access point sufficient to support VoIP telephony;

determine whether the hybrid mobile device is currently connected to an IP network access point;

establish a first communication link between the call server and the hybrid mobile device using the VoIP telephone number over a packet data network when the connection status indicator for the hybrid mobile device is sufficient;

establish a first communication link between the call server and the hybrid mobile device using the cellular telephone number over a cellular network when the connection status indicator for the hybrid mobile device is insufficient;

establish a second communication link between the call server and the target communication device using the target telephone number; and join the first and second communication links to establish a communication session between the hybrid mobile device and the target communication device.

9. The call server of claim 8, the processor operable to execute one or more software modules, the software modules including instructions that when executed:

insert the VoIP telephone number of the hybrid mobile device in a caller ID field when establishing a second communication link between the call server and the target communication device.

10. The call server of claim 8, wherein the communication session establishment message is comprised of a Message Queue Telemetry Transport (MQTT) message delivered over an IP network.

11. The call server of claim 8, wherein the communication session establishment message is comprised of a Message Queue Telemetry Transport (MQTT) message delivered, in part, over an IP channel of a cellular network.

12. The call server of claim 8, wherein the communication session establishment message is received as an SMS text message delivered over an IP network.

13. The call server of claim 8, wherein the communication session establishment message is received as an SMS text message delivered, in part, over a cellular network.

14. The call server of claim 8, the processor operable to execute one or more software modules, the software modules including instructions that when executed establish the first communication link by:

sending a Session Initiation Protocol (SIP) invite to the hybrid mobile device, wherein the SIP invite is sent over (i) one or more IP networks using the VoIP telephone number of the hybrid mobile device when the connection status indicator for the hybrid mobile device is sufficient, or (ii) one or more IP networks and at least a portion of a mobile carrier network using the cellular telephone number of the hybrid mobile device when the connection status indicator for the hybrid mobile device is sufficient;

receive a SIP 200; and send a SIP acknowledgement.

15. At least one non-transitory machine-readable medium comprising a set of instructions that in response to being executed on a computing device cause the computing device to:

receive a communication session establishment message from the hybrid mobile device, the hybrid mobile device having an associated VoIP telephone number and an associated cellular telephone number, the message indicative of the hybrid mobile device wanting to place a call to the target communication device, the target communication device having an associated target telephone number, the communication session establishment message including information pertaining to the VoIP telephone number, the cellular telephone number, the target telephone number, and a connection status indicator, the connection status indicator indicative of whether the hybrid mobile device has an IP connection with an IP access point sufficient to support VoIP telephony;

determine whether the hybrid mobile device is currently connected to an IP network access point;

establish a first communication link between the call server and the hybrid mobile device using the VoIP telephone number over a packet data network when the connection status indicator for the hybrid mobile device is sufficient;

establish a first communication link between the call server and the hybrid mobile device using the cellular telephone number over a cellular network when the connection status indicator for the hybrid mobile device is insufficient;

establish a second communication link between the call server and the target communication device using the target telephone number; and join the first and second communication links to establish a communication session between the hybrid mobile device and the target communication device.

16. The non-transitory machine-readable medium of claim 15, comprising a set of instructions that in response to being executed on a computing device cause the computing device to:

insert the VoIP telephone number of the hybrid mobile device in a caller ID field when establishing a second communication link between the call server and the target communication device.

17. The non-transitory machine-readable medium of claim 15, wherein the communication session establishment message is comprised of a Message Queue Telemetry Transport (MQTT) message delivered over an IP network.

18. The non-transitory machine-readable medium of claim 15, wherein the communication session establishment message is comprised of a Message Queue Telemetry Transport (MQTT) message delivered, in part, over an IP channel of a cellular network.

19. The non-transitory machine-readable medium of claim 15, wherein the communication session establishment message is received as an SMS text message delivered over an IP network.

20. The non-transitory machine-readable medium of claim 15, wherein the communication session establishment message is received as an SMS text message delivered, in part, over a cellular network.

21. The non-transitory machine-readable medium of claim 15, comprising a set of instructions that in response to being executed on a computing device cause the computing device to establish the first communication link by:

sending a Session Initiation Protocol (SIP) invite to the hybrid mobile device, wherein the SIP invite is sent over (i) one or more IP networks using the VoIP telephone number of the hybrid mobile device when the connection status indicator for the hybrid mobile device is sufficient, or (ii) one or more IP networks and at least a portion of a mobile carrier network using the cellular telephone number of the hybrid mobile device when the connection status indicator for the hybrid mobile device is sufficient;

receive a SIP 200; and send a SIP acknowledgement.

\* \* \* \* \*